United States Patent [19]

Stevenson

[11] 4,111,716

[45] Sep. 5, 1978

[54] METHOD AND APPARATUS FOR PREPARING EMPTY CHEMICAL CONTAINERS FOR DISPOSAL

[75] Inventor: James Santon Stevenson, Oakland, Calif.

[73] Assignee: Terminator Products, Inc., Oakland, Calif.

[21] Appl. No.: 735,762

[22] Filed: Oct. 22, 1976

Related U.S. Application Data

[62] Division of Ser. No. 588,417, Jun. 19, 1975.

[51] Int. Cl.$^2$ .............................................. B08B 3/10
[52] U.S. Cl. ........................................ 134/10; 15/302; 15/304; 100/DIG. 2; 134/17; 134/21; 134/24; 134/166 R
[58] Field of Search ..................... 137/1, 101.11, 205, 137/239, 563, 604, 15, 240; 239/124, 310, 350, 127; 222/133, 318, 95, 96, 148; 210/169; 134/10, 16, 17, 21, 22 R, 166 R, 24; 214/300, 304; 252/301.1 W; 15/304, 302; 100/DIG. 2; 215/11 E

[56] References Cited

U.S. PATENT DOCUMENTS

| | | | |
|---|---|---|---|
| 1,492,922 | 5/1924 | Knight | 134/10 |
| 2,240,364 | 4/1941 | Kimball et al. | 134/21 |
| 3,342,377 | 9/1967 | Peredy | 222/95 X |
| 3,776,408 | 12/1973 | Wald | 215/11 E |

Primary Examiner—Richard V. Fisher

[57] ABSTRACT

A method and system for carrying out the method, relating to mixing of solutions, wherein the base liquid in a tank is circulated through an endless circuit while the chemical is gradually introduced into the circulating flow base liquid to achieve thorough mixing. A chemical is withdrawn under valve control into a measuring receptacle prior to mixing same with the base liquid. Provision is included for rinsing the chemical source container, the resulting rinse solution being automatically introduced into the tank, leaving the source container in condition to meet legal requirements for disposal. To simplify disposal of rinsed containers and discourage re-use thereof, a feature of the method and system involves means creating a differential pressure between the outside and inside of the containers for collapsing the containers. A novel multiple valve assembly enables all features to be embodied in a simplified and condensed system.

5 Claims, 7 Drawing Figures

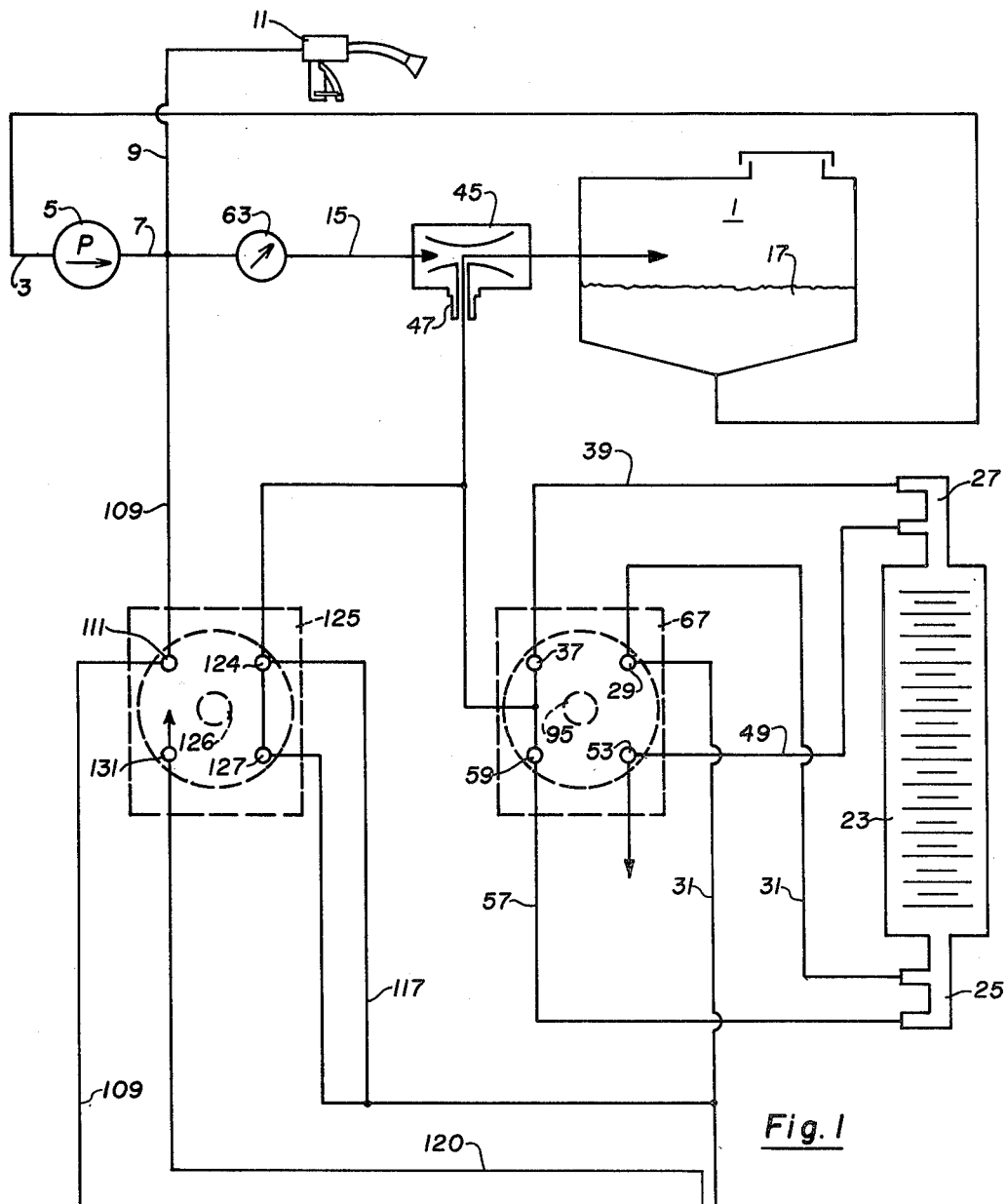
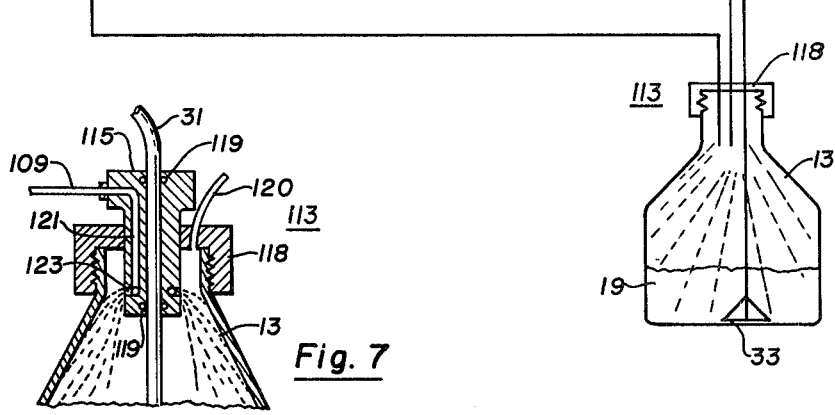
Fig. 1
Fig. 7

METHOD AND APPARATUS FOR PREPARING EMPTY CHEMICAL CONTAINERS FOR DISPOSAL

This is a division of application Ser. No. 588,417, filed June 19, 1975.

This invention relates to the preparation of chemical solutions and more particularly with respect to the preparation of spray solutions involving a hazardous ingredients such as one may find, for example, in the preparation of solutions involving particles for spraying purposes, and will be described in connection with a system specifically adapted for such purpose.

With regard to the preparation of such solution, it is current practice to place a measured amount of the base liquid, in this case water, into a tank and then pour into a measuring receptacle, a desired amount of the pesticide from its original or source container and dumping this measured amount of chemical into the tank, where it is then mixed with the base liquid. Such handling of the chemical, particularly where the chemical is of a dangerous character as are a number of pesticides, may involve considerable risk to the individual handling the same, and, more so, when pouring such ingredient into the calibrated receptacle when held at or above eye level to observe the rise of level to a selected calibration scale marking.

The disposal of such original source containers when empty, has also involved such hazard, and to a degree that laws have been promulgated to require that such containers be thoroughly rinsed before disposal.

Among the objects of the present invention are:

(1) To provide a novel and improved method and apparatus for the preparation of chemical solutions;

(2) To provide a novel and improved method for preperation of chemical solutions which will assure thorough mixing and with safety to the individual;

(3) To provide a novel and improved method for the cleaning of a source container of residual chemical in preparation for disposal of such container;

(4) To provide novel and improved means for rendering such source containers unsuitable for re-use as containers.

(5) To provide a novel and improved apparatus for the withdrawal of chemical from a source container to a measuring receptacle with minimum risk to an individual;

(6) To provide a novel and improved valve assembly to render such apparatus compact and readily controllable by an operator.

Additional objects of the invention will be brought out in the following description of a preferred embodiment of the same, taken in conjunction with the accompanying drawings wherein:

FIG. 1 is a schematic view of a system embodying the present invention;

FIG. 7 is a view in section through a closure for a container involved in the system of FIG. 1.

Figure 2:
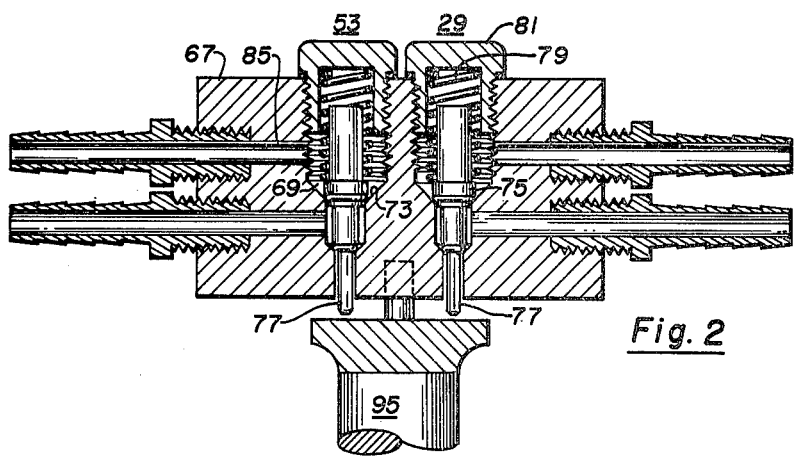
FIG. 2 is a longitudinal view in section through a pair of valve assemblies of a multiple valve assembly constituting an important feature of the system of FIG. 1.
Figure 6:
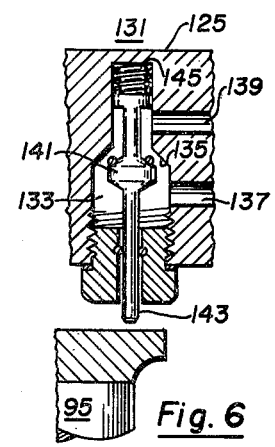
FIG. 6 is a fragmentary view in section depicting a valve assembly of the normally open type, employable in the system of the present invention.
Figure 3:
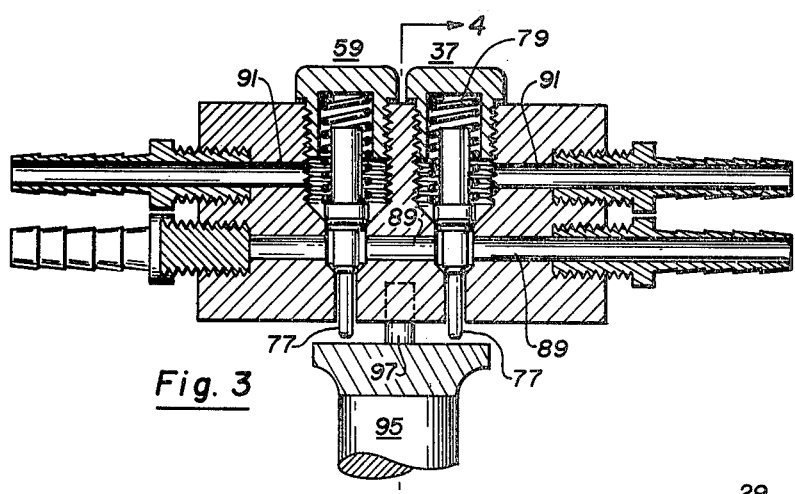
FIG. 3 is a similar longitudinal view in section through an oppositely located pair of valve assemblies of said multiple valve assembly.
Figure 5:
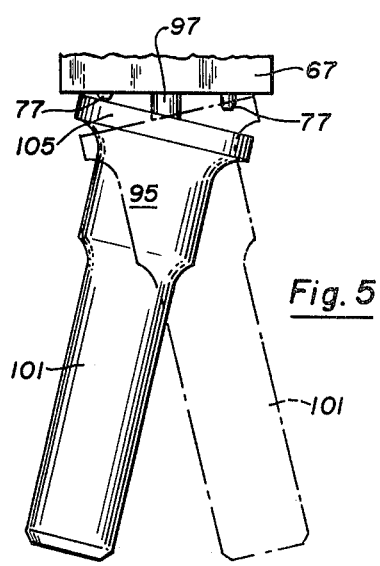
FIG. 5 is a view in elevation of the valve handle assembly depicted in section in FIG. 4.
Figure 4:
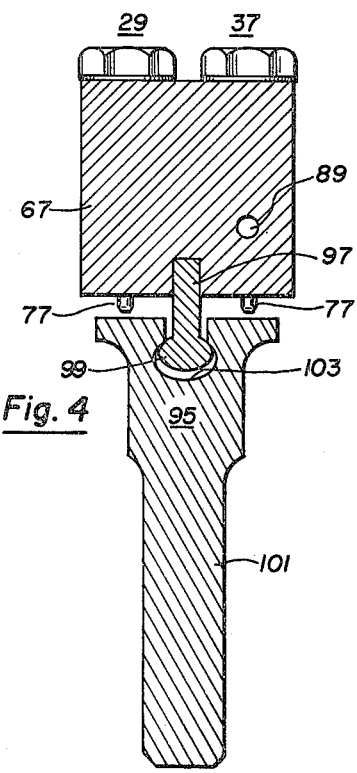
FIG. 4 is a view in section taken through the multiple valve assembly of FIGS. 3 and 4, in the plane 4—4 of FIG. 3.

Referring to the drawings for specific details of the invention as illustrated, a tank 1 for holding the solution, is flow connected to the suction end 3 of a pump 5, the discharge side 7 of which is connected by a hose line 9 to a spray gun 11 which is valve controlled.

In accordance with predominate current practice, a measured amount of a base liquid which, in this case will be water, is placed in the tank, and a measured amount of the spray chemical is then poured into the tank and mixed with the base liquid, preparatory to spraying. The quantity of base liquid and chemical for a particular solution is selected in accordance with a predetermined ratio.

In actual practice the desired amount of each is measured out largely through guess work based on experience and the resulting concentrations may be somewhat off from the actual ratio desired. Such approach represents an open system which exposes the individual to the hazards of handling inherently dangerous chemicals.

In accordance with the method and apparatus of the present invention, the source container 13 in which the chemical is purchased, is coupled into a system and, thereafter, all the operations involving the withdrawal of the desired quantity of the chemical from the source container and mixing it with the base liquid, and the operation of rinsing the source container when empty, in preparation for disposal of the container, are all under control of an operator and with essentially no risk of contact with the chemical involved.

Toward this end, a flow line 15 is installed between the discharge side of the pump and the tank, to form an endless circulating system whereby the pump may withdraw liquid from the tank and pump it back into the tank in a continuous circulating fashion.

The base liquid 17 may be added to the tank in the conventional manner by previously measuring out a quantity and pouring it into the tank. Such operation may be greatly facilitated by introducing the proper amount of base fluid into the tank in the manner disclosed in my copending application for Mixture Calibration Apparatus, Ser. No. 532,995 filed Dec. 16, 1974.

In accordance with such disclosure, a pressure gauge is exposed by tubing, to the pressure at the geometrical center of the bottom of the tank, whereby the gauge will respond to pressure of the base liquid being supplied to the tank, and indicate the same in terms of any desirable unit, and such gauge will indicate such quantity sufficiently accurate, despite any tilting of the tank, as might occur when the vehicle on which the tank may be mounted, is resting on a sloping surface.

The means for withdrawing a desired quantity of chemical 19 from the source container 13 involves a vertically mounted calibrated receptacle 23 having a flow fitting at 25 its lower end, and a similar fitting 27 at its upper end, the lower flow fitting being connectable through a normally closed valve assembly 29 by means of tubing 31, to the source container where the tubing terminates in a strainer 33 within the container.

The upper flow fitting is connected through a similar normally closed valve assembly 37 by tubing 39 for connection to a source of sub-atmosphere pressure or vacuum to be described. Under these conditions, chemical will be withdrawn from the source container into the calibrated receptacle, so long as the valves of these two valve assemblies are held open, and when the desired quantity of chemical has been so withdrawn, further withdrawal can be halted by closing of the valves.

In the preferred form of the invention, the source, of sub-atmospheric pressure or vacuum is built into the circulating system involving the pump and tank, by inserting at a high pressure point such as a discharge side of the pump, a Venturi 45 with a fitting 47 at the low pressure region of the Venturi to provide an exposable source of sub-atmospheric pressure or vacuum. As the tank liquid circulates through the Venturi, the desired reduced pressure will be developed.

If, perchance, one should inadvertently withdraw more than the desired quantity of chemical from the source container, a reverse flow of the chemical from the calibrated receptacle back to the source container can be set in motion by controlled exposure of the upper end of the calibrated receptacle to atmospheric pressure, after cutting off the source of such atmospheric pressure by closing of the valve in the valve assembly 37.

This may readily be accomplished by a flow connection 49 to atmosphere through a normally closed valve assembly 53 which, upon opening, will expose the upper region of the calibrated receptacle to atmospheric pressure, and this condition will prevail so long as this valve is held open. Thus as the level of chemical in the calibrated receptacle drops under gravity, to the calibration representing the desired quantity, the valve assembly 53 may be shut off to halt further drainage back to the source container.

The cross-section of the calibrated receptacle being substantially greater than that of the tubing to the source receptacle, the rate of drop of liquid level in the calibrated receptacle during such drainage will be sufficiently slow to enable sufficient accuracy in halting the drainage flow at the proper marking.

When the desired quantity of chemical has been transferred from the source container to the calibrated receptacle, such chemical may then be added to the base liquid in the tank, to obtain the proper ratio of chemical to base liquid for the desired resulting solution.

The means for accomplishing this utilizes as a component part thereof, the same source of sub-atmospheric pressure, namely the Venturi, as was previously used in the withdrawal of the chemical from its source container, and includes in addition to the Venturi, a flow line 57 from the lower fitting of the calibrated receptacle to the Venturi, via a normally closed valve assembly 59, and in conjunction with the previously described vent line 49 to the upper fitting and its included normally closed valve assembly 29. With both these valve assemblies 59 and 53 in open condition, subatmospheric pressure will be developed at the lower end of the calibrated receptacle, while atmospheric pressure will prevail in the upper end, and the chemical will be gradually introduced into the circulating system through the Venturi where it will thoroughly mix with the base liquid as the base liquid flows through the Venturi.

When the calibrated receptacle has been thoroughly emptied, the base liquid and chemical will have been thoroughly mixed, and no stirring or further agitation will be required to prepare the solution for use, though some continuous agitation may be desirable to avoid separation or stratification of the chemical with respect to the base liquid, if that is a possibility.

After the solution has thus been prepared, and to condition the system for use of the spray gun, the mixing portion of the system is preferably isolated to provide full pump pressure to the spray gun, and this may be readily accomplished by inserting a shut-off valve assembly 63 in the line to the Venturi and beyond the flow path to the spray gun from the pump. The closing of this valve assembly will at the same time block the circulating system, thereby rendering the Venturi inactive.

In lieu of utilizing a Venturi to provide a source of subatmospheric pressure or vacuum, one might insert a coupling in the suction line to the pump, to provide an exposable source of subatmospheric pressure or vacuum at this location in the circulating system, but the use of a Venturi on the discharge side of the pump, for this purpose, as described, is preferred, in that the pump will not be exposed in the same degree to any possible detrimental effects from contact with the chemical, as when the suction line of the pump is relied on as the source of subatmospheric pressure or vacuum.

Since the operation of the mixing system as thus far described, calls for simultaneous manipulation of valve assemblies in pairs, the memorizing of which valve assemblies perform which functions and which valve assemblies have to function simultaneously for any particular stage in the operation in the system, could present problems to an operator. To overcome and avoid such problems, and render the entire system more compact and convenient to operate, the four valve assemblies involved, are combined into a multiple valve assembly involving a common block 67 which provides housing for each valve assembly, and a single control for manipulating the valves of such valve assemblies in pairs, as desired.

Such block, to meet the requirements of the present invention, is provided with four parallel terraced passageways 69 therethrough, located on the corners of a square. One of the terraces of each passageway is sloped to provide a valve seat 73 for a valve 75 having an O-ring resting on the seat, and a valve stem 77 protruding through the smaller end of the passageway. The valve is normally retained in closed position by a compression spring 79 held in pressure engagement with the valve by a screw cap 81 threaded into the larger end of the passageway. Pressure applied to the exposed valve stem, sufficient to overcome the spring pressure, will unseat the valve. Flow passageways through the block connecting with the valve passageway, above and below the valve, will be flow connected when the valve is unseated.

Each of the two valve assemblies 29 and 53 has a passageway 83 to the region below the valve seat and a passageway 85 to the region above the valve seat, whereby each of these two valve assemblies is isolated from the other. As for the remaining two valve assemblies 37 and 59, they have a flow passageway 89 in common, which may connect with the region below the valve in each assembly, whereas in the region of each above the valve, a separate passageway 91 for each valve assembly is provided. Thus, whichever of these two valve assemblies is open, that is the one which will function.

A valve handle assembly 95 is installed on the exposed pin side of the block, symmetrically with respect to these valve pins, for use in manipulating the various valves in selected pairs. Such valve handle assembly involves a bolt 97 threaded into the block at the center of the square defined by the valve pins, such bolt terminating in a exposed ball 99. A handle 101, at its lower end, is recessed to provide a socket 103 to receive the ball, and is retained on the bolt head in a ball and socket relationship by a plate 105 affixed to the recessed end of the handle, and of a size to cover all for pins. The handle, being capable of being rocked, can then be manipulated in an upward direction to simultaneously depress the valve pins of valve assemblies 29 and 37 to effect withdrawing of chemical into the calibrated receptacle from the source container, or can be deflected downwardly to simultaneously lift the valves of valve assemblies 53 and 59 to effect a gradual introduction of such chemical into the tank via the Venturi.

If, in the withdrawal of chemical from the source container into the calibrated receptacle, more chemical is withdrawn than desired, then the valve handle may be shifted to the right to simultaneously lift valves of the valve assemblies 29 and 53 to permit drainage of some of that chemical by gravity, back into the source container.

Inasmuch as each of the aforementioned directional movements of the handle will enable performance of a complete step in the mixing operation, a simple word or symbol may be applied to the block in association with any pair of valve assemblies to indicate the step to be accomplished through opening of such pair of valves, thus eliminating the necessity for an operator to memorize valve functions and valve associations as would be the case were the valve assemblies distributed individually throughout the system and not associated under a common control handle as described.

As previously indicated, the disposal of source containers, when empty, becomes a real problem due to hazardous nature of many of the chemicals which are sold in such containers. Such containers, when empty, may not be disposed of indiscriminately, and it is against the law in various states, the dispose of such containers at local dumps without first rinsing them of any residual chemicals.

To facilitate the handling of such containers, the present invention provides for the rinsing of such, and disposing of the diluted rinse contents by pumping it into the tank to mix with the rest of the chemical solution, thus eliminating the added problem of disposing of such residual chemical.

Toward accomplishing this objective, a flow line 109 from the discharge side of the pump through a normally closed valve assembly 111, terminates in a spray fitting 113 adapted to pass through the mouth of the source container, where discharge therefrom may be directed radially against the interior walls of the container to wash therefrom any residual chemical adhering to the walls.

This spray fitting may take the form of a plug 115 fitting tightly through a screw cap 118, and provided with a central passageway to receive the tubing 31, preferably through O-ring seals 119, and a spray passageway 121 connecting with a plurality of radial discharge passages 123 directed high against the side walls of the container.

An air vent tube 120 is installed in the cap.

A return flow line 117 from the tube 31, connects through another normally closed valve assembly 124 to the Venturi. For this rinsing function, the Venturi must be activated and thus, the shutoff valve 63 will have to be open. With sufficient solution in the tank for the purpose, then the two valve assemblies 111 and 124 will be opened and the rinsing operation will proceed. It is desirable that the flow from the pump to the source container and the return flow to the Venturi during rinsing should be substantially balanced or, as a safety factor, the flow to the Venturi should be slightly higher than that from the pump to the source container, in order to avoid any possibility of the container overflowing. However, this is not a serious problem, as the valve assembly 111, being a normally closed device, will shut off upon release of control thereof, should the source container threaten to fill. By maintaining valve assembly 124 open, the contents of the source container will empty to the tank.

When adequate rinsing has been accomplished, the valve assembly 111 in the pump line to the source container is closed to disconnect the pump, but to drain any residual contents of rinsing liquid from the container, if any remain, calls for holding valve assembly 124 in open condition until removal of the residual liquid is accomplished.

To simplify the system further, however, these two valve assemblies 111 and 124 are placed in a common housing block 125 under a single control handle assemblly 126 in the same manner as with valve assemblies 29, 37, 53 and 59, to operate as a pair, whereby by swinging the handle upward, both will be opened simultaneously. With such an arrangement, a third valve assembly 127 is added in parallel flow relationship to the valve assembly 124 in the line to the Venturi, and this valve assembly may then be held in open condition by swinging of the handle downwardly to effect emptying of the source container of any residual rinse liquid.

As regards both multiple valve assemblies discussed, the valves are arranged in accordance with a predetermined pattern, whereby with a common handle, these valves may be actuated singly, or in pairs as indicated. Similar multiple valve assemblies may be so assembled as to be able to actuate simultaneously, more than two valves, if the system called for it.

Once the source container has thus been rinsed and is in condition for safe disposal, it becomes desirable that such containers not be used for other purposes. If such containers are of plastic or thin sheet metal, the destruction thereof to discourage further use thereof as containers could be readily accomplished with the system disclosed and without any additional equipment other than providing means for closing the vent tube 120.

For this purpose, a normally open valve assembly 131 is added to the valve assembly block 125 in position to be actuated simultaneously with valve assembly 127 in the downward position of the handle.

This valve assembly involves a passageway 133 terraced in reverse to those of the normally closed type and presenting a sloping valve seat 135 to one side of which connects a flow passageway 137 and to the side of which connects a flow passageway 139.

A valve 141 in the passageway 133, faces the valve seat 135, and has a valve stem 143 projecting from the block 125 toward the handle assembly. The valve is normally maintained in unseated condition (normally open) by a spring 145 engaging the valve on the side opposite the valve stem. The vent tube 120 is connected through this valve assembly to atmosphere.

With such arrangement, the air vent tube may be blocked off while the Venturi continues to function, and under these conditions, continued evacuation of the source container will result in the establishment of subatmospheric pressure or vacuum therein, and to a degree where ultimately, the body of the container can no longer withstand the differential pressure to which it becomes exposed and will cave in and collapse, thereby rendering it useless thereafter as a container. Should subsequent exposure of the interior to atmospheric pressure permit the material of the collapsed container to partially restore the container, this can be discouraged by promptly capping the container following collapse thereof.

From the foregoing description of the invention in its preferred form, it will be apparent that the same fulfills all the objects thereof, and further, is subject to alteration and modification without departing from the underlying principles thereof. I accordingly do not desire to be limited in my protection to the specific details illustrated and described except as may be necessitated by the appended claims.

I claim:

1. The method of preparing an empty hazardous chemical container for disposal, comprising first rinsing said container with a rinse liquid, sealing said container to atmosphere, and then exposing the interior of said container to a subatmospheric pressure such as to create a differential pressure between the outside and inside of said container, sufficient to collapse said container.

2. The method of preparing an empty hazardous chemical container for disposal, in accordance with claim 1, characterized by first venting said container prior to rinsing of the same, and while supplying rinse liquid to said container, simultaneously conducting rinse liquid from said container to a tank.

3. The method of preparing an empty hazardous chemical container for disposal, in accordance with claim 2, characterized by shutting off flow of said rinse liquid following adequate rinsing and ceasing venting of said container while evacuating the same.

4. Apparatus for preparing an empty hazardous chemical container for disposal following discharge of its contents in the preparation of a spray solution, comprising means for supplying rinse liquid to said container and discharging said liquid from said container to a tank holding such solution, and means for creating a differential pressure between the outside and inside of said container sufficient to collapse said container following completion of a rinsing operation.

5. Apparatus in accordance with claim 4 characterized by said means for creating said differential pressure including means for sealing said container to atmosphere and means for evacuating said container while maintaining said container sealed.

* * * * *